(12) United States Patent
Griffin

(10) Patent No.: US 11,853,304 B2
(45) Date of Patent: Dec. 26, 2023

(54) SYSTEM AND METHOD FOR AUTOMATED DATA AND WORKFLOW LINEAGE GATHERING

(71) Applicant: Striveworks Inc., Austin, TX (US)

(72) Inventor: Matthew Griffin, Austin, TX (US)

(73) Assignee: Striveworks Inc., Austin, TX (US)

( * ) Notice: Subject to any disclaimer, the term of this patent is extended or adjusted under 35 U.S.C. 154(b) by 0 days.

(21) Appl. No.: 17/459,907

(22) Filed: Aug. 27, 2021

(65) Prior Publication Data

US 2023/0064243 A1    Mar. 2, 2023

(51) Int. Cl.
| | |
|---|---|
| G06F 16/2455 | (2019.01) |
| G06F 9/48 | (2006.01) |
| G06F 16/242 | (2019.01) |
| G06F 11/28 | (2006.01) |
| G06F 11/34 | (2006.01) |
| G06F 16/2458 | (2019.01) |
| G06F 16/25 | (2019.01) |
| G06F 16/22 | (2019.01) |
| G06F 16/28 | (2019.01) |

(52) U.S. Cl.
CPC ...... *G06F 16/24568* (2019.01); *G06F 9/4881* (2013.01); *G06F 16/244* (2019.01); *G06F 16/288* (2019.01)

(58) Field of Classification Search
CPC ............. G06F 16/24568; G06F 16/244; G06F 16/288; G06F 9/4881
See application file for complete search history.

(56) References Cited

U.S. PATENT DOCUMENTS

| | | | |
|---|---|---|---|
| 9,075,860 B2 | 7/2015 | Kozina | |
| 9,659,042 B2 | 5/2017 | Puri | |
| 10,025,878 B1 | 7/2018 | Lefever | |
| 10,037,329 B2 | 7/2018 | Aggarwal | |
| 10,089,335 B2 | 10/2018 | Liensberger | |
| 10,120,923 B2 | 11/2018 | Mcclure | |
| 10,210,240 B2 | 2/2019 | Vasisht | |
| 10,372,761 B2 | 8/2019 | He | |

(Continued)

OTHER PUBLICATIONS

Mwebaze, Johnson, Danny Boxhoorn, and Edwin A. Valentijn. "Tracing and using data lineage for pipeline processing in Astro-WISE." Experimental Astronomy 35.1 (2013): 131-155. (Year: 2013).*

(Continued)

*Primary Examiner* — Mohsen Almani
(74) *Attorney, Agent, or Firm* — Fitch, Even, Tabin & Flannery LLP (57) ABSTRACT

Systems, apparatuses, and methods are provided herein for tracking data lineage. A method for tracking data lineage comprises detecting, with a data lineage recorder module, an execution of a task of a workflow by a workflow engine on a device, the workflow comprises a plurality of ordered tasks, detecting, with a data lineage proxy, a request sent from the device, selecting, with the data lineage recorder module, request lineage data items associated with the task from a content of the request, associating, in a data lineage database, the request lineage data items with the task, and generating a data lineage graph comprising representations of the plurality of ordered tasks of the workflow including the task and the request lineage data items associated with the task.

24 Claims, 6 Drawing Sheets

(56) References Cited

U.S. PATENT DOCUMENTS

| | | | |
|---|---|---|---|
| 10,481,961 | B1 | 11/2019 | Chapin |
| 10,528,367 | B1* | 1/2020 | Liu ........................ G06F 9/4498 |
| 10,769,165 | B2 | 9/2020 | Simon |
| 2014/0279979 | A1* | 9/2014 | Yost ....................... G06F 16/904 707/798 |
| 2017/0270022 | A1 | 9/2017 | Moresmau |
| 2018/0144067 | A1 | 5/2018 | Chatelain |
| 2018/0287920 | A1* | 10/2018 | Sanganabhatla ...... H04L 67/303 |
| 2018/0373781 | A1* | 12/2018 | Palrecha ................. G06F 9/547 |
| 2020/0026710 | A1 | 1/2020 | Przada |
| 2020/0265356 | A1 | 8/2020 | Lee |
| 2021/0326366 | A1* | 10/2021 | Chandrahasan ........ G06F 16/38 |

OTHER PUBLICATIONS

Jadon et al., "Machine Learning Pipeline for Predictions Regarding a Network"; EP 3 933 701 A1; Application No. 20198113.1: Date of filing: Sep. 24, 2020 (Year: 2020).*

Heorhiadi, Victor, et al. "Gremlin: Systematic resilience testing of microservices." 2016 IEEE 36th International Conference on Distributed Computing Systems (ICDCS). IEEE, 2016. (Year: 2016).*

Cinque M, Della Corte R, Pecchia A. Microservices monitoring with event logs and black box execution tracing. IEEE transactions on services computing. Sep. 6, 2019;15(1):294-307. (Year: 2019).*

Suriarachchi, Isuru, Quan Zhou, and Beth Plale. "Komadu: A capture and visualization system for scientific data provenance." Journal of Open Research Software 3.1 (2015). (Year: 2015).*

Ghoshal, Devarshi, et al. "Science Capsule: Towards Sharing and Reproducibility of Scientific Workflows." 2021 IEEE Workshop on Workflows in Support of Large-Scale Science (Works). IEEE, 2021. (Year: 2021).*

Hofmann, Felipe Alex; "Tracer: A Machine Learning Approach to Data Lineage"; Massachusetts Institute of Technology 2020, May 2020, https://dspace.mit.edu/bitstream/handle/1721.1/127410/1192561054-MIT.pdf?sequence=1&isAllowed=y; 79 pages.

Flyte; "What is Data Catalog?" ; https://docs.flyte.org/en/latest/concepts/catalog.html; May 26, 2021; pp. 1-2; Retrieved from Internet Archive Wayback Machine http://web.archive.org/web/*/https://docs.flyte.org/en/latest/concepts/catalog.html on Nov. 8, 2021.

Oracle; "Oracle Enterprise Metadata Management", https://www.oracle.com/middleware/technologies/enterprise-metadata-management.html; Aug. 5, 2020; pp. 1-2; retrieved from Internet Archive Wayback Machine http://web.archive.org/web/20201029033911/https://www.oracle.com/middleware/technologies/enterprise-metadata-management.html on Nov. 8, 2021.

Oracle; "Oracle Data Sheet"; Oracle Enterprise Metadata Management; Available at least as early as Aug. 27, 2021; pp. 1-4.

Mahto, Jayant et al.; "OEMM: Configuring Data Lineage Analysis"; https://www.oracle.com/webfolder/technetwork/tutorials/obe/fmw/odi/oemm_12c/oemm_dla.html#section4, Available at least as early as Aug. 27, 2021, pp. 1-22.

Apache; "Lineage"; https://airflow.apache.org/docs/apache-airflow/stable/lineage.html; Jan. 20, 2021; pp. 1□3 ; retrieved from Internet Archive Wayback Machine https://web.archive.org/web/20210120214016/https://airflow.apache.org/docs/apache-airflow/stable/lineage.html on Nov. 24, 2021.

Pachyderm; "How Does Pachyderm Accomplish Data Lineage"; https://www.pachyderm.com/data-lineage/; Apr. 23, 2020; pp. 1□7 ;retrieved from Internet Archive Wayback Machine https://web.archive.org/web/20200423224701/https://www.pachyderm.com/data-lineage/ on Nov. 24, 2021.

Manta; "Supported Technologies"; https://getmanta.com/technologies/databases/; Aug. 14, 2020; pp. 1□ 3; retrieved from Internet Archive Wayback Machine https://web.archive.org/web/20200814070822/https://getmanta.com/technologies/databases/ on date Nov. 24, 2021.

Manta; "Data Lineage Done Right"; getmanta.com; Jul. 11, 2021; pp. 1□4; retrieved from Internet Archive Wayback Machine https://web.archive.org/web/20170711173126/https://getmanta.com/ on Nov. 24, 2021.

* cited by examiner

```
postgres=# select * from artifact;
                  id                  |              description
--------------------------------------+----------------------------------------
 08f63b27-f1fe-4ad8-a0fa-67589b38d152 | {"name": "Microservice Execution 2"}
 11e98a91-b081-48ab-a8bb-c1605130e943 | {"name": "Output Q"}
 121c54b4-80f0-4ef6-8a3c-cced690a9bc9 | {"name": "Workflow A Task 1 Execution 1"}
 175cedb6-f600-45aa-90b5-aa2bde908be8 | {"name": "Workflow A Execution 1"}
 1d450d3d-d295-42e8-b3dd-aa979b8c9aa1 | {"name": "Workflow A Task 2"}
 266e0c3b-5cc6-4f6c-a36c-46f1f7fff92f | {"name": "Output X"}
 2b74966a-85c8-473b-bbeb-425f98eb55d7 | {"name": "Microservice N"}
 2c201448-63ff-45ff-b649-d2c23ccf691c | {"name": "Workflow A Task 1"}
 36fc46a0-e0d3-4a2c-9bc1-89db217c059f | {"name": "Workflow A Execution 2"}
 4199e08b-a504-492e-bf27-46e2201ecd43 | {"name": "Output Z"}
 5718fdfe-e2f5-4e06-ac22-be1f39fa4c1c | {"name": "Workflow A Task 1 Execution 2"}
 7d41f78b-ace8-419d-b5cd-811c844b1801 | {"name": "Microservice Request 1"}
 81b1da4d-7ff0-4b74-ad9f-e975b3898b7d | {"name": "Microservice Response 2"}
 8367158d-938b-425f-ba98-92676ff0cecb | {"name": "Input Y"}
 85e06615-ed00-4ca2-b399-c910c1498487 | {"name": "Workflow A"}
 9b75795a-10fe-47a9-912b-c426fcb27272 | {"name": "Microservice Response 1"}
 9c746115-f1f2-4062-a6be-48af41eb7ba1 | {"name": "Output P"}
 a5564a00-2a91-4469-bbf8-4ec6a445e605 | {"name": "Microservice Request 2"}
 d35a080d-33a6-45a5-96da-47db9bbf0caf | {"name": "Input X"}
 d67b733f-87e7-45fc-b1bd-8c76666687d4 | {"name": "Microservice Execution 1"}
 d9ba9aa7-b8e6-475b-b737-b50362886d4a | {"name": "Workflow A Task 2 Execution 1"}
 e850ef24-06c1-4998-95ad-1844ed5dadb4 | {"name": "Input Z"}
 e89bd513-1435-4863-8a80-6ab00439eda9 | {"name": "Workflow A Task 2 Execution 2"}
(23 rows)
```

*FIG. 5A*

```
postgres=# select * from lineage_edge;
            id            |                 source                 |               destination
--------------------------+----------------------------------------+----------------------------------------
 667568813319585793 | 85e06615-ed00-4ca2-b399-c910c1498487 | 175cedb6-f600-45aa-90b5-aa2bde908be8
 667568813319684097 | 85e06615-ed00-4ca2-b399-c910c1498487 | 36fc46a0-e0d3-4a2c-9bc1-89db217c059f
 667568813319716865 | 85e06615-ed00-4ca2-b399-c910c1498487 | 2c201448-63ff-45ff-b649-d2c23ccf691c
 667568813319749633 | 85e06615-ed00-4ca2-b399-c910c1498487 | 1d450d3d-d295-42e8-b3dd-aa979b8c9aa1
 667568813319782401 | 175cedb6-f600-45aa-90b5-aa2bde908be8 | 121c54b4-80f0-4ef6-8a3c-cced690a9bc9
 667568813319815169 | 175cedb6-f600-45aa-90b5-aa2bde908be8 | d9ba9aa7-b8e6-475b-b737-b50362886d4a
 667568813319847937 | 36fc46a0-e0d3-4a2c-9bc1-89db217c059f | 5718fdfe-e2f5-4e06-ac22-be1f39fa4c1c
 667568813319880705 | 36fc46a0-e0d3-4a2c-9bc1-89db217c059f | e89bd513-1435-4863-8a80-6ab00439eda9
 667568813319913473 | 2c201448-63ff-45ff-b649-d2c23ccf691c | 121c54b4-80f0-4ef6-8a3c-cced690a9bc9
 667568813319946241 | 2c201448-63ff-45ff-b649-d2c23ccf691c | 5718fdfe-e2f5-4e06-ac22-be1f39fa4c1c
 667568813319979009 | 1d450d3d-d295-42e8-b3dd-aa979b8c9aa1 | d9ba9aa7-b8e6-475b-b737-b50362886d4a
 667568813320011777 | 1d450d3d-d295-42e8-b3dd-aa979b8c9aa1 | e89bd513-1435-4863-8a80-6ab00439eda9
 667568813320044545 | d35a080d-33a6-45a5-96da-47db9bbf0caf | 121c54b4-80f0-4ef6-8a3c-cced690a9bc9
 667568813320077313 | 8367158d-938b-425f-ba98-92676ff0cecb | 121c54b4-80f0-4ef6-8a3c-cced690a9bc9
 667568813320110081 | 8367158d-938b-425f-ba98-92676ff0cecb | 5718fdfe-e2f5-4e06-ac22-be1f39fa4c1c
 667568813320142849 | e850ef24-06c1-4998-95ad-1844ed5dadb4 | 5718fdfe-e2f5-4e06-ac22-be1f39fa4c1c
 667568813320175617 | 121c54b4-80f0-4ef6-8a3c-cced690a9bc9 | 266e0c3b-5cc6-4f6c-a36c-46f1f7fff92f
 667568813320208385 | 5718fdfe-e2f5-4e06-ac22-be1f39fa4c1c | 4199e08b-a504-492e-bf27-46e2201ecd43
 667568813320241153 | 266e0c3b-5cc6-4f6c-a36c-46f1f7fff92f | d9ba9aa7-b8e6-475b-b737-b50362886d4a
 667568813320273921 | 4199e08b-a504-492e-bf27-46e2201ecd43 | e89bd513-1435-4863-8a80-6ab00439eda9
 667568813320306689 | d9ba9aa7-b8e6-475b-b737-b50362886d4a | 7d41f78b-ace8-419d-b5cd-811c844b1801
 667568813320339457 | d9ba9aa7-b8e6-475b-b737-b50362886d4a | 11e98a91-b081-48ab-a8bb-c1605130e943
 667568813320372225 | e89bd513-1435-4863-8a80-6ab00439eda9 | a5564a00-2a91-4469-bbf8-4ec6a445e605
 667568813320404993 | e89bd513-1435-4863-8a80-6ab00439eda9 | 9c746115-f1f2-4062-a6be-48af41eb7ba1
 667568813320437761 | 7d41f78b-ace8-419d-b5cd-811c844b1801 | d67b733f-87e7-45fc-b1bd-8c76666687d4
 667568813320470529 | a5564a00-2a91-4469-bbf8-4ec6a445e605 | 08f63b27-f1fe-4ad8-a0fa-67589b38d152
 667568813320503297 | 2b74966a-85c8-473b-bbeb-425f98eb55d7 | d67b733f-87e7-45fc-b1bd-8c76666687d4
 667568813320536065 | 2b74966a-85c8-473b-bbeb-425f98eb55d7 | 08f63b27-f1fe-4ad8-a0fa-67589b38d152
 667568813320568833 | d67b733f-87e7-45fc-b1bd-8c76666687d4 | 9b75795a-10fe-47a9-912b-c426fcb27272
 667568813320601601 | 08f63b27-f1fe-4ad8-a0fa-67589b38d152 | 81b1da4d-7ff0-4b74-ad9f-e975b3898b7d
 667568813320634369 | 9b75795a-10fe-47a9-912b-c426fcb27272 | d9ba9aa7-b8e6-475b-b737-b50362886d4a
 667568813320667137 | 81b1da4d-7ff0-4b74-ad9f-e975b3898b7d | e89bd513-1435-4863-8a80-6ab00439eda9
(32 rows)
```

*FIG. 5B*

SYSTEM AND METHOD FOR AUTOMATED DATA AND WORKFLOW LINEAGE GATHERING

TECHNICAL FIELD

This invention relates generally to data management and, more particularly, to data lineage gathering.

BACKGROUND

Data lineage refers to the source and flow of data over time. Data lineage gives visibility and simplifies error tracking in a data analytics process, especially in big data and machine learning workflows. Conventionally, data lineage tracking is done either manually or as a part of, or tied to, specific workflow engines. Conventional data lineage trackers are generally restricted to the programming languages and database structures supported by the particular workflow engine and do not track data flows outside of the workflow engine.

BRIEF DESCRIPTION OF THE DRAWINGS

Disclosed herein are embodiments of systems and methods for providing data lineage tracking. This description includes drawings, wherein:

FIGS. 5A and 5B comprise an illustration of an example data output of a data lineage tracking system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein for tracking data lineage.

In some embodiments, a data lineage tracking system captures and stores inputs and processing steps used to produce data artifacts, collectively known as their "lineage," for later queries. A data lineage graph refers to a directed graph of data artifacts showing which artifacts are used to create each new artifact. As used herein, a data artifact may refer to a contributor to the creation of a new artifact (i.e. "process artifact") or a piece of data created by another artifact (i.e. "data artifact"). In some embodiments, data artifacts tracked by the data lineage tracking system may include data in any format such as database tables, collections, rows, container images, git commits, workflows, tasks, etc. In some embodiments, process artifacts tracked by the system may comprise microservice requests/responses, web service requests/responses, datastore requests/responses, workflow executions, task executions, etc. In some embodiments, data lineage information may be captured as the processing of a workflow flows from data sources, through processing, and to its eventual consumption. In some embodiments, the data lineage tracking system may be used in both training and production operations of a machine learning operation ("MLops"). Generally, the data lineage tracking system may be used with data workflows for a variety of purposes and applications.

In some embodiments, the systems and methods described herein are workflow engine agnostic, being configured to gather data lineage from a variety of types of workflow engines including batch processing workflow engines and stream processing workflow engines. In some embodiments, the systems and methods described herein are datastore agnostic. Generally, "datastore" as used herein refers broadly to include traditional relational database management systems (RDBMS), modern NoSQL databases, document databases, graph databases, key value store, and other types of storage of structured or semi-structured data. In some embodiments, the systems and methods described herein may be programming language agnostic, configured to record data from workflows utilizing a variety of programming languages and programming libraries.

In some embodiments, the systems and methods described herein allow a user to define which pieces of information are important to store as lineage data/artifact. In some embodiments, these definitions may be changed at runtime. In some embodiments, the systems and methods described herein may track data lineage through services, microservices, datastores, and other components. In some embodiments, the systems and methods described herein may track data lineage across multiple workflow engines being used simultaneously and integrate the tracked data lineage information from multiple workflow engines in the same datastore and data lineage graph. In some embodiments, data lineage for calls to services, microservices, and datastores are consolidated to reduce storage and complexity.

Figure 1:
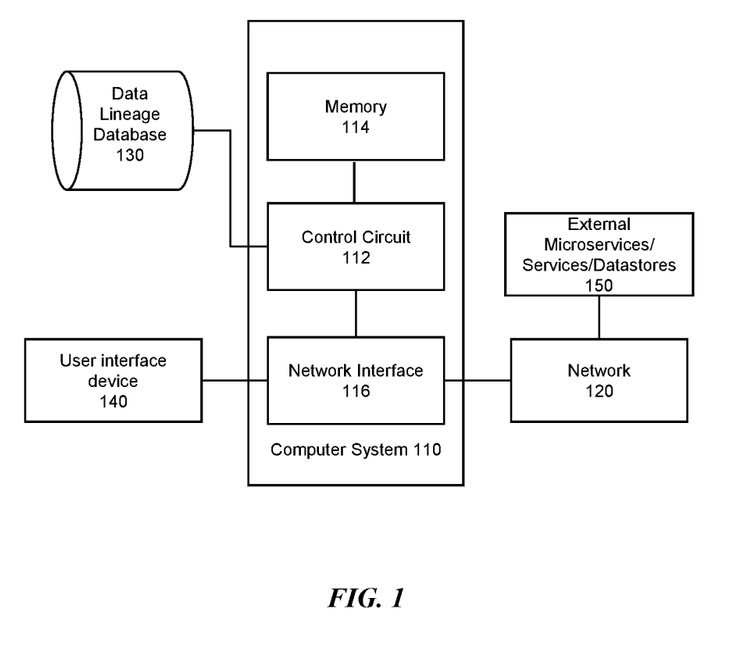
FIG. 1 comprises a system diagram of a data lineage tracking system in accordance with some embodiments.

Referring now to FIG. 1, a system for data lineage tracking is shown. A computer system 110 configured for data lineage tracking is coupled to a data lineage database 130, a user interface device 140, and a plurality of external microservices, services, and datastores 150 via a network 120.

The computer system 110 comprises a control circuit 112, a memory 114, and a network interface device 116. The computer system 110 may comprise one or more of a server, a central computing system, a desktop computer system, a personal computer, a portable device, and the like. The control circuit 112 may comprise a processor, a microprocessor, a central processing unit (CPU), a graphics processing unit (GPU), an application-specific integrated circuit (ASIC), and the like and may be configured to execute computer-readable instructions stored on a computer-readable storage memory 114. The computer-readable storage memory 114 may comprise volatile and/or non-volatile memory and have stored upon it, a set of computer-readable instructions which, when executed by the control circuit 112, causes the computer system 110 to provide data lineage tracking for one or more data workflows and generate a data lineage graph. As used herein, a data lineage graph generally refers to data that includes data lineage artifacts with interconnections thereof and may or may not be a graphical rendering of such data. In some embodiments, the computer-executable instructions may cause the control circuit 112 of the computer system 110 to perform one or more steps described with reference to FIGS. 2-3 herein. In some embodiments, the computer-executable instructions may cause the control circuit 112 of the computer system 110 to provide a user interface for configuring the data lineage tracking system, and/or viewing and interacting with the generated data lineage graph, such as the data lineage graph described with reference to FIG. 4. In some embodiments, the computer system 110 may further execute the workflow engine(s) tracked by the data lineage tracking system. In some embodiments, the data lineage database 130 may be implemented on the memory 114.

The network interface device 116 may comprise a data port, a wired or wireless network adapter, and the like. In some embodiments, the computer system 110 may communicate with the user interface device 140 and the network 120 over a network such as a local network, a private network, or the Internet. The computer device may access a plurality of external microservices, services, and datastores 150 via a network 120.

The external microservice, services, and datastores 150 may comprise sources of data that a workflow may access via the network 120. As used herein, a service used by a workflow or a task refers to as service in a service-oriented architecture which separates functions into distinct units, or services, that developers make accessible over a network to allow users to combine and reuse them in the production of applications. In some embodiments, a service may be implemented based on a web service standard such as SOAP, Jini, CORBA, Internet Communications Engine, REST, or g RPC. As used herein, a microservice generally refers to a service in a microservice architecture. In some embodiments, a microservice comprises a service that communicates over a network to fulfill requests using technology-agnostic protocols such as HTTP and GraphQL. In some embodiments, a microservice may be implemented using different programming languages, databases, hardware environments, and software environments.

The user interface device 140 comprises user input/output devices such as a keyboard, a mouse, a touch screen, a display screen, a VR/AR display device, a speaker, a microphone, etc. In some embodiments, the user interface device 140 may be a processor-based standalone user device such as a personal computer, a desktop computer, a laptop computer, a mobile device, a smartphone, and the like. The user interface device 140 may execute an application for configuring the data lineage recorder and/or displaying a data lineage graph provided by the computer system 110. In some embodiments, the user interface device 140 may comprise the input/output user interface of the computer system 110 executing the program for viewing and interacting with the data lineage information and graph provided by the computer system 110. In some embodiments, a data lineage user interface may be provided by the computer system 110 via the user interface device 140, the data lineage user interface comprises a configuration interface for configuring the selection of the lineage data items from information captured by the data lineage tracking system.

The data lineage database 130 comprises a computer-readable memory storage storing data lineage information. In some embodiments, data lineage information for a workflow may comprise data lineage artifact unique identifiers for each identified process or data artifact and connection identifiers each associated with a source artifact identifier and a destination artifact identifier. An example of data lineage information stored in a data lineage database 130 is described with reference to FIGS. 5A and 5B. In some embodiments, the data lineage database may further store values or pointers to values of data artifacts such as database tables, collections, rows, container images, git commits, etc. In some embodiments, the data lineage database 130 may be implemented in a variety of database formats such as RDBMS, modern NoSQL databases, document databases, graph databases, and other types of storage of structured or semi-structured data. In some embodiments, data lineage information stored in the data lineage database 130 may be determined by the computer system 110 based on the processes and steps described with reference to FIGS. 2-3 herein. In some embodiments, the information in the data lineage database 130 may be used to generate a data lineage graph such as the data lineage graph described with reference to FIG. 4. In some embodiments, the data lineage database 130 or the memory 114 may further store user configuration and customizations for the data lineage tracking system such as configurations for the selection of lineage data for requests and responses captured by a data lineage proxy of the computer system 110.

While one computer system 110 is shown, in some embodiments, the functionalities of the computer system 110 may be implemented on a plurality of processor devices communicating on a network. In some embodiments, the computer system 110 may be coupled to a plurality of user interface devices and simultaneously support multiple instances of the user interface application on each user interface device 140 to track data lineage information. In some embodiments, the computer system 110 may itself be a server for a service of a microservice providing data lineage tracking functionalities to another device over the network.

In some embodiments, the system implemented on the computer system 110 may be installed along a machine learning operations (MLOps) platform. An MLOps platform provides an environment for the development of machine learning models. An MLOps platform may provide a data scientist the ability to collect, process, and label data in order to build, train, and test mathematical models for the purpose of eventual deployment of that model into a production application. Those mathematical models might estimate unknown quantities, predict future behavior, or perform other inference tasks. In some embodiments, with the data lineage tracking system, the MLOps platform operates normally—workflows that index data or analyze indexed data are defined by the programmer and then run within the context of a workflow engine, which orchestrates their operation. The data lineage tracking system may automatically record the data lineage of the artifacts produced by the processing workflows. As part of this, the system interprets events emitted by the workflow engine and intercepts service, microservice, and datastore requests made by the workflow, using a data lineage proxy.

For example, a user may first create a workflow comprising tasks in a particular partial ordering on a set of inputs. The workflow engine orchestrates the running of the workflow and its component tasks. Workflow-1 may contain task-1, task-2, and task-3, and the output of task-1 is the input of task-2 and the output of task-2 is the input of task-3. Upon starting the first task, task-1, and feeding the input data to the task, the workflow engine will emit an event that is interpreted by the data lineage tracking system. During interpretation of workflow events, the data lineage tracking system records the identity of the device on which the task will be run. The identity may be defined by the internet protocol (IP) address of the processing host. In some embodiments, the proxy may add unique headers to requests from each task that would provide alternative location information. The system may automatically configure the data lineage proxy to understand that requests from that IP address are related to that task. In the example, the system would identify the request as being associated with task-1 and the workflow which contains it, workflow-1. In some embodiments, the system further records the inputs that were sent to the task.

As the task is run it may make requests to additional services, microservices, and datastores. These requests are intercepted by the data lineage proxy and processed by a data lineage recorder that is extensible and configurable. The recorder interprets the information included in the request, selects information to include in the data lineage graph, and upon forwarding the request and receiving a response, interpret the information included in the response and select information to include in the data lineage graph and forward the response to the requester. In some embodiments, the selected information is held until the task finishes processing and the workflow engine emits an event with the output of the task.

The selected information is then used to create artifacts in the data lineage graph connected to the task which did the processing, and the system creates an artifact in the lineage graph for the output of the task. The system may repeat the process for each subsequent task (e.g. task-2, task-3). For task-2, the output of task-1 may be recorded as linked to the input of task-2. For task 3, the output of task-2 may be recorded as linked to the input of task-3. Further details of the data lineage tracking functions of a data lineage tracking system according to some embodiments are described with reference to FIGS. 2-3 herein.

Figure 2:
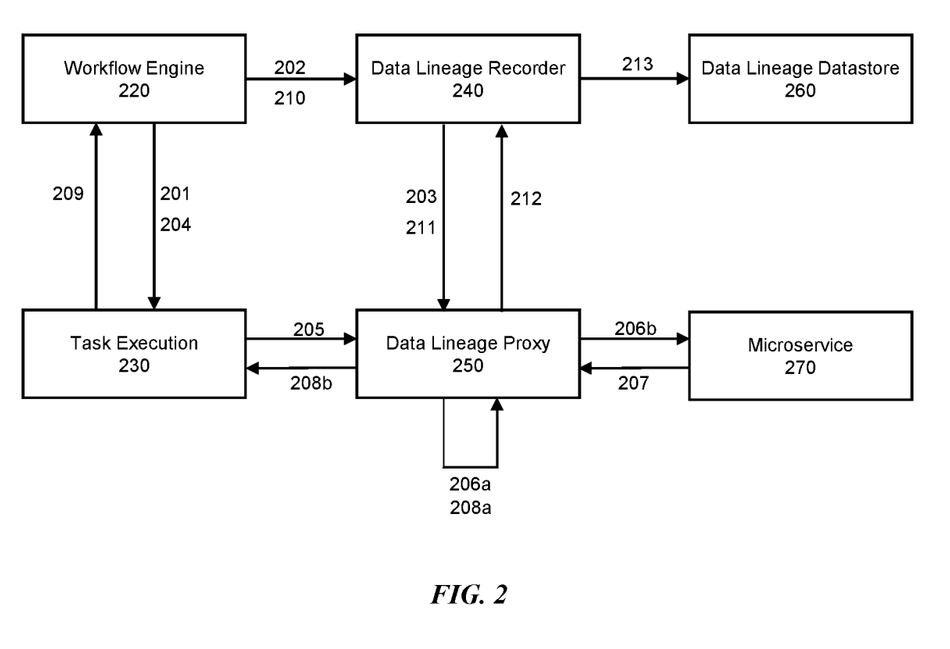
FIG. 2 comprises a block diagram in accordance with some embodiments.

Referring now to FIG. 2, a block diagram showing a process for providing data lineage tracking is shown. In some embodiments, components in FIG. 2 may comprise software or hardware modules executed by one or more processor-based devices such as the computer system 110 described with reference to FIG. 1. In some embodiments, the steps shown in FIG. 2 may be performed by a processor-based device such as a control circuit executing a set of computer-readable instructions stored on a computer-readable memory. In some embodiments, one or more steps of FIG. 2 may be performed by the computer system 110 described with reference to FIG. 1 herein or a similar device.

In some embodiments, the workflow engine 220, the task execution 230, the data lineage recorder 240, and the data lineage proxy 250 may each comprise a software application or module executed by one or more processor-based devices. The workflow engine 220 generally refers to an application for managing the processing and structuring of data in a sequence of steps. In some embodiments, the workflow engine may comprise a graphical user interface including a graph-based representation of a workflow that a user may create and modify. The task execution 230 refers to the execution of a task in a workflow as defined via the workflow engine 220.

The data lineage recorder 240 is part of a data lineage tracker system that records data lineage information based on communications with the workflow engine and the data lineage proxy 250. In some embodiments, the data lineage recorder 250 is configured to record process and data artifacts based on events emitted by the workflow engine 220. In some embodiments, the data lineage recorder 240 may apply default or user defined configuration to convert information captured by the data lineage proxy 250 into data lineage data items to store in the data lineage datastore 260. In some embodiments, the data lineage recorder 240 is configured to record lineage data items from a plurality of data formats. In some embodiments, the data lineage recorder module is configured to record events and data from workflows utilizing different programming languages and programming libraries.

The data lineage proxy 250 may be a software or hardware proxy that is coupled between the task execution 230 and a network. Task execution 230 may access networked services such as the microservice 270 via the data lineage proxy 250 and the data lineage proxy 250 is configured to capture requests made by the task execution 230 and responses received from the network. In some embodiments, the data lineage proxy may associate a device identifier (e.g. IP address) to the device performing the task execution 230 and identify requests and responses associated with the task execution based on the device identifier. In some embodiments, the data lineage proxy 250 may add a header to a request from task execution 230 prior to forwarding the request and use the header to identify the task or the device associated with a response received from the microservice 270.

The microservice 270 refers to a service in a microservice architecture used by the executed task. While a microservice 270 is used as an example of a network data source in FIG. 2, in some embodiments, the data lineage proxy may also capture responses and requests from other network data sources such as web services and datastores as described with reference to FIGS. 1 and 2. In some embodiments, the data lineage proxy may capture requests and responses from a plurality of different network data sources (e.g. web service, microservice, datastore) during the execution of a task or a workflow.

The data lineage datastore 260 comprises a computer-readable memory storage storing data lineage information. In some embodiments, data lineage information for a workflow may comprise data lineage artifact unique identifiers for each identified process or data artifact and connection identifiers each associated with a source artifact identifier and a destination artifact identifier. An example of data lineage information stored in a data lineage datastore 260 is described with reference to FIGS. 5A and 5B. In some embodiments, the data lineage database may further store values or pointers to values associated with artifacts. In some embodiments, the data lineage database may be implemented in a variety of database formats. In some embodiments, the data lineage database may comprise the data lineage database 130 described with reference to FIG. 1.

For a task, the workflow engine 220 first creates a task in step 201 and, in step 202, communicates to the data lineage recorder 240 that a task in the workflow has been created. In step 203, the data lineage recorder 240 adds task context to the data lineage proxy 250. In some embodiments, task context may comprise the IP address or other device or location identifier associated with the executed task.

In step 204, the workflow engine triggers the task at task execution 230. In step 205, task execution 230 makes a call (i.e. request) to a microservice 270 that passes through the data lineage proxy 250. The data lineage proxy 250 intercepts and records the request from task execution 230 in step 206a and forwards the request to the microservice 270 in step 206b. In step 207, the microservice 270 provides a response to the request which is intercepted by the data lineage proxy 250. The data lineage proxy 250 records the response in step 208a and forwards the response to the task execution 230 in step 208b. In some embodiments, the data lineage proxy 250 may use the IP address or other device/location identifier of the request and response to identify the requests and responses associated with the task. In some embodiments, the data lineage proxy 250 may add a header to an outgoing request and identify the response based on the header.

In step 209, the task execution completes the task, and in step 210, the workflow engine 220 communicates the task completion to the data lineage recorder 240. In step 211, the workflow engine retrieves recorded request and response from the data lineage proxy 250. The request and response are sent from the data lineage proxy to the data lineage recorder 240 in step 212. In some embodiments, the data lineage recorder 240 may apply default or user customized configuration in selecting data lineage items from among the content of the request and the response captured by the data lineage proxy 250. In step 213, the data lineage recorder 240 stores response data lineage items and requests data lineage items in the data lineage datastore 260. In some embodiments, the data lineage recorder 240 may further capture and store other artifacts from the workflow in the data lineage datastore 260, such as task input, output, and other events emitted from the workflow engine 220.

In some embodiments, one or more steps shown in FIG. 2 may be repeated for each task in a workflow. For a task that does not make a call to a network data source, steps 203, 205, 206a, 206b, 207, 208a, 208b, 211, and 212 may be omitted. In some embodiments, the steps shown in FIG. 2 may be repeated for different executions of the same task. In some embodiments, the data lineage recorder 240 and the data lineage proxy 250 may be coupled to multiple workflow engines and combine data lineage information from different workflow engines in the data lineage datastore 260. In some embodiments, the data lineage proxy 250 may intercept requests to and responses from multiple network data sources (e.g. web service, microservice, datastore) during a task or workflow execution.

Figure 3:
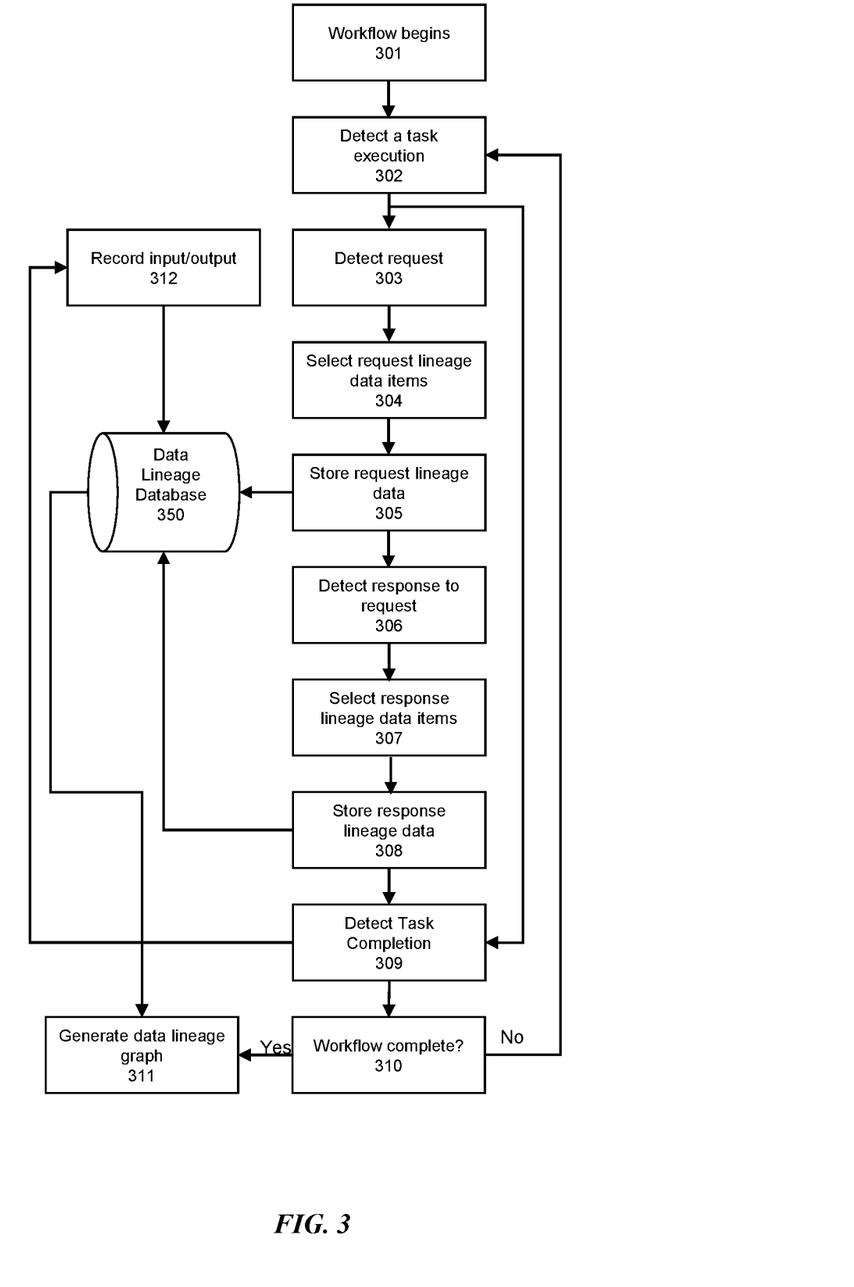
FIG. 3 comprises a flow diagram in accordance with some embodiments.

Referring now to FIG. 3, a process for data lineage tracking is shown. In some embodiments, the process shown in FIG. 3 may be performed by a processor-based device such as a control circuit executing a set of computer-readable instructions stored on a computer-readable memory. In some embodiments, one or more steps of FIG. 3 may be performed by the computer system 110 described with reference to FIG. 1 herein or a similar device.

In step 301, a workflow is executed by a workflow engine. In step 302, the system detects the execution of a task of a workflow by the workflow engine on a device, the workflow comprises a plurality of ordered tasks. In some embodiments, the inputs of a task, such as the initial task of the workflow, may be recorded at step 302. In some embodiments, prior to step 303, the system may determine a device or location identifier to the device executing the task, and requests and responses associated with the task or workflow are detected by a data lineage proxy based on the device identifier of the device in steps 303 and 306.

In step 303, the system detects a request from the device. In some embodiments, the request may be detected by a proxy situated between the device and recipients of the request. In some embodiments, the request comprises a call to a network data source such as a microservice, a web service, or a web datastore over a network such as the Internet. In some embodiments, the request may be a message to a microservice using a technology-agnostic protocols such as HTTP and GraphQL. In some embodiments, the request may be identified as being associated with the task executed on the device based on an identifier associated with the device, such as the IP address of the device. In some embodiments, the proxy may add a header to an outgoing request and identify the corresponding response based on the header. In some embodiments, if no request is detected before the completion of the task, the process moves to step 309, and the output of the task is recorded in step 311.

In step 304, the system selects request lineage data items associated with the task from the content of the request detected in step 303. The request lineage data item may comprise one or more data artifacts and/or process artifacts. For example, request lineage data items may comprise the request and the entity of the network data source called. The request lineage data item further includes one or more connections between the identified artifacts. For example, a connection associated with the task may identify the executed task as a source and the request as a destination. In some embodiments, the system may apply default or user-defined configurations in the selection of lineage data items from the content of the request. In some embodiments, the configuration may define the values, headers, cells, etc. of the request message that is to be selected to determine lineage data items. In step 305, the request lineage data item is associated with the task in the data lineage database 350. In some embodiments, the request lineage data items may be held at the data lineage recorder and step 305 may occur, instead, after the completion of the task in step 309.

In step 306, the system detects a response to the request. In some embodiments, the response may be detected by the proxy situated between the device and sender of the response. In some embodiments, the response comprises a message from a network data source such as a microservice, a web service, or a web datastore over a network such as the Internet. In some embodiments, the response may be a message from a microservice using a technology-agnostic protocols such as HTTP and GraphQL. In some embodiments, the response may be identified as being associated with the task executed on the device based on an identifier associated with the device, such as the IP address of the device. In some embodiments, the proxy may add a header to an outgoing request and identify the corresponding response based on the header.

In step 307, the system selects response lineage data items associated with the task from the content of the request detected in step 303. The response lineage data item may comprise one or more data artifacts and/or process artifacts. For example, the response lineage data item may comprise the response and the entity of the network data source providing the response. The response lineage data item further includes one or more connections between the identified artifacts. For example, a connection associated with the task may identify the response as a source and the task execution as a destination. In some embodiments, the system may apply default or user defined configurations in the selection of lineage data items from the content of the response similar to step 304. In step 308, the response lineage data item is associated with the task in the data lineage database 350. In some embodiments, step 308 may occur, instead, after the completion of the task in step 309.

In some embodiments, steps 303-308 may be repeated for a task if a task makes multiple requests to one or more network data sources.

In step 309, the system detects the completion of the task and records the output of the task in step 312. In some embodiments, the output of a task is used as the input of the next task in the workflow. In step 310, if the workflow is not completed, the system returns to steps 302 and repeats the process for the next task in the workflow. For example, the system may detect the execution of a subsequent task of the workflow, detect with the data lineage proxy, a subsequent request associated with the subsequent task sent from the device, and select, with the data lineage recorder, request lineage data items associated with the subsequent task from a content of the subsequent request. Response data lineage items for the subsequent task may be similarly determined. Request and response data lineage items are then associated with the subsequent task and stored in the data lineage database 350.

If the workflow is completed, in step 310, the data in the data lineage database 350 may be used to generate a data lineage graph. In some embodiments, the data lineage graph may comprise graphical representations of the plurality of ordered tasks of the workflow including the task, and identified artifacts (e.g. request lineage data items and response lineage data items) associated with the task. In some embodiments, the system may further be configured to identify a recipient (e.g. microservice, web service, datastore, etc.) of the request based on one or more of the IP address of the recipient, the content of the request, and the content of the response. In some embodiments, the data lineage graph may further comprise a representation of the recipient of the request (e.g. microservice, service, datastore). In some embodiments, the process shown in FIG. 3 may be repeated for multiple executions of a workflow or for multiple workflows on the same or different workflow engines. Data lineage information from multiple workflows, multiple executions of a workflow, and/or different workflow engines may be combined into a single data lineage graph in the present system. An example of a data lineage graph according to some embodiments is described with reference to FIG. 4 herein.

Figure 4:
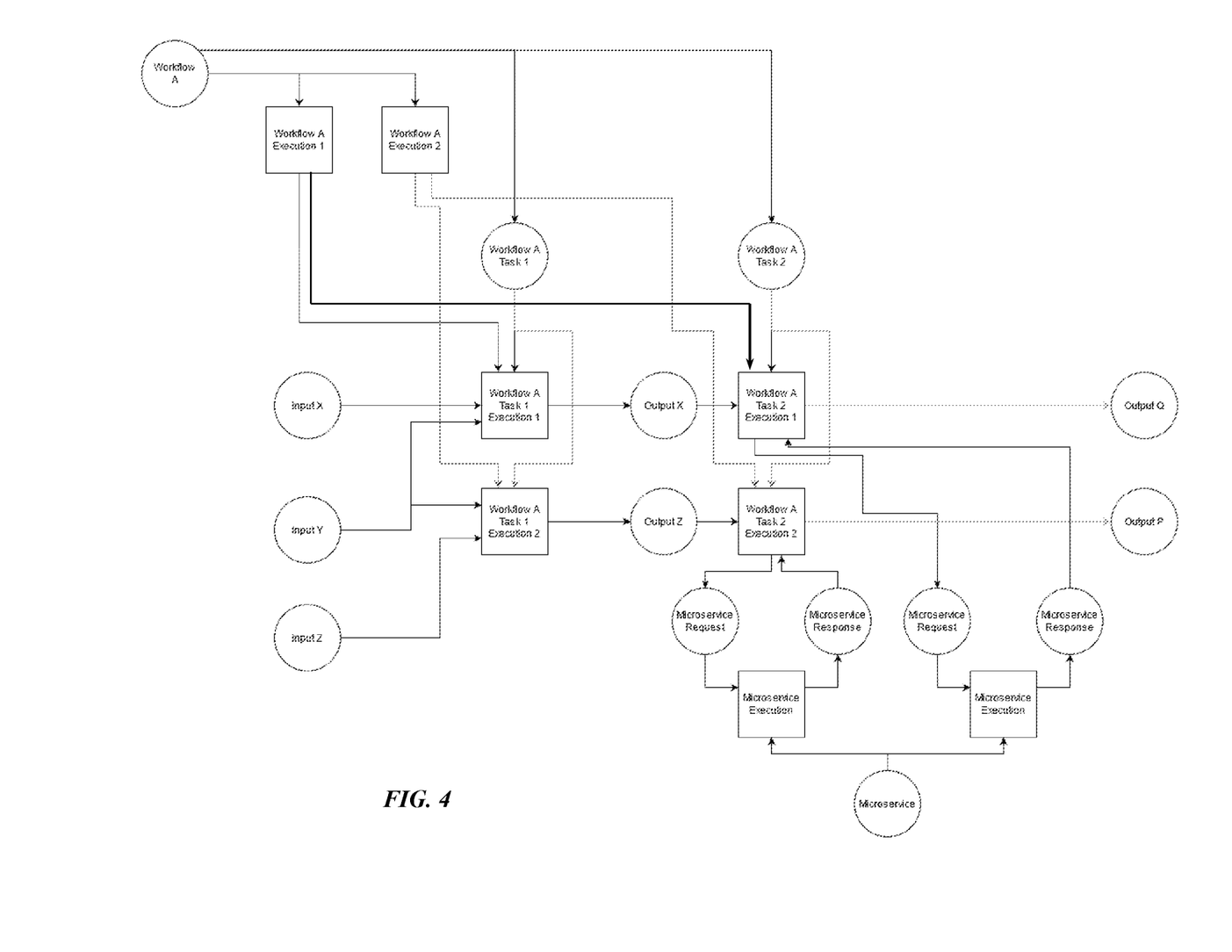
FIG. 4 comprises an illustration of an example data lineage graph in accordance with some embodiments.

Next referring to FIGS. 4, 5A, and 5B, an example output of a data lineage tracking system is shown. FIG. 4 comprises an example of a graphic rendering of the data recorded by a data lineage tracking system. FIGS. 5A and 5B comprise an example of data lineage information stored in the data lineage datastore in SQL queries. In some embodiments, FIG. 4 and/or FIGS. 5A-B may be examples of an output of the systems and methods described with reference FIGS. 1-3.

In FIGS. 4, 5A, and 5B, Workflow A comprises two tasks (Task 1 and Task 2). As an example, Workflow A may be an object detection workflow. Task 1 may take a collection of images as input and apply a transformation to the images to generate an output collection of images. Task 2 may take the output of Task 1 and send the transformed images to a microservice that performs object detection. Task 2 may then receive object detection data from the microservice and output, as the output of the workflow, an associative array of image names to corresponding objects detected.

Graphic rendering a data lineage graph in FIG. 4 includes artifacts of a workflow ("Workflow A Execution 1," "input X," "Workflow A Task 1 Execution 1," etc.) and their interconnections that are graphically represented. In FIG. 4, two executions of Workflow A are shown. In the first execution (Workflow A Execution 1), Input X and Input Y are used as inputs for "Workflow A Task 1 Execution 1" which generates Output X. "Workflow A Task 2 Execution 1" takes Output X from "Workflow A Task 1 Execution 1" as its input and sends the input to a microservice to further process the data. "Workflow A Task 2 Execution 1" then receives a response back from the microservice and generates Output Q based on the response from the microservice.

In the second execution, "Workflow A Task 1 Execution 2" has a different set of inputs, Input Y and Input Z. "Workflow A Task 1 Execution 2" generates Output Z as input to "Workflow A task 2 Execution 2." "Workflow A Task 2 execution 2" takes Output Z from Task 1 as its input and sends the input to a microservice to further process the data. "Workflow A Task 2 execution 2" then receives a response back from the microservice Output P based on the response from the microservice.

FIG. 4 is provided as an example only, the data lineage graph may be presented in a variety of ways and may include different nodes and connections based on the workflow and data lineage information being graphed. A workflow may include any number of tasks and any number of executions of a workflow may be combined into one graph. In some embodiments, a graph may combine data lineage information from multiple workflows. For example, if two or more workflows exchange data, the data lineage graph may combine tasks and inputs/outputs of the workflows tracked by the data lineage tracking system. In some embodiments, the tasks may send requests and receive responses from other network data sources such as a web service and a networked datastore. In some embodiments, the nodes of the graph may be selectable to display additional information such as values of the data, links to data files, configuration of services/microservices/datastore used by the tasks.

FIGS. 5A and 5B comprise an example of the information in FIG. 4 as stored in a data lineage database. In FIG. 5A, a list of data lineage artifacts as identified by the data lineage tracking system are each assigned an artifact unique identifier and a text description. In FIG. 5B, connections between each of the artifacts are each assigned a connection unique identifier and associated with artifact unique identifiers of the source and destination artifacts. The connections indicate the direction of movement of data in the workflow.

FIGS. 5A and 5B are provided as an example of stored data only. The output of the data lineage system may be stored in a variety of database formats such as non-relational databases (e.g. key-value stores, object stores, or graph stores), text files, and graphical depictions.

In some embodiments, the systems and methods described herein are not bound to the use of a particular workflow engine and may be used with new workflow engines based on emitted events and routing workflow web traffic through a data lineage proxy. In some embodiments, the systems and methods described herein provide configurable/extensible data lineage tracking. The information gathered from workflow service, microservice, and/or datastore requests and workflow engine events is not limited by what is built into the system at launch and may instead be updated at runtime. In some embodiments, an end-user may configure what lineage information should be stored for each workflow. In some embodiments, the systems and methods described here are not limited to a particular set of datastore technologies and may be integrated with multiple different datastores to track lineage across disparate datastores. In some embodiments, the systems and methods described herein are not limited to data produced within the workflow engine being used for a workflow and data owned by a particular application or entity. Data lineage may be uniformly represented for both data that is managed by the selected workflow engine(s), and outside the management of those workflow engines. In some embodiments, the systems and methods described herein may track data lineage across datastores, workflows, tasks, executions, and service or microservice requests, and can further track the configuration of microservices and services used in workflows. In some embodiments, the systems and methods described herein do not require the use of a particular programming library or programming language and can provide a single and unified data lineage graph when using multiple workflow engines together. For example, two workflow engines (one for batch processing and one for stream processing) may be used to process data within a single MLops system, and data lineage information from both engines may be combined within the same running instance of the system. In some embodiments, the systems and methods described herein enable identification of mistakes or poorly performing workflow components such as user can identify and replace the problem component and have the appropriate downstream data be recalculated. The systems and methods may also allow the results of a workflow to be replicated.

In some embodiments, a method for tracking data lineage comprises detecting, with a data lineage recorder module, an execution of a task of a workflow by a workflow engine on a device, the workflow comprises a plurality of ordered tasks, detecting, with a data lineage proxy, a request sent from the device, selecting, with the data lineage recorder module, request lineage data items associated with the task from a content of the request, associating, in a data lineage database, the request lineage data items with the task, and generating a data lineage graph comprising representations of the plurality of ordered tasks of the workflow including the task and the request lineage data items associated with the task.

In some embodiments, a system for tracking data lineage comprises a data lineage database and a processor coupled to the data lineage database and executing a data lineage proxy and a data lineage recorder module. The processor being configured to detect, with the data lineage recorder module, an execution of a task of a workflow by a workflow engine on a device, the workflow comprises a plurality of ordered tasks, detect, with the data lineage proxy, a request sent from the device, select, with the data lineage recorder module, request lineage data items associated with the task from a content of the request, associate, in the data lineage database, the request lineage data items with the task, and generate a data lineage graph comprising representations of the plurality of ordered tasks of the workflow including the task and the request lineage data items associated with the task.

In some embodiments, an apparatus for tracking data lineage comprises a non-transitory storage medium storing a set of computer readable instructions and a control circuit configured to execute the set of computer readable instructions which cause to the control circuit to detect, with a data lineage recorder module, an execution of a task of a workflow by a workflow engine on a device, the workflow comprises a plurality of ordered tasks, detect, with a data lineage proxy, a request sent from the device, select, with the data lineage recorder module, request lineage data items associated with the task from a content of the request, associate, in a data lineage database, the request lineage data items with the task, and generate a data lineage graph comprising representations of the plurality of ordered tasks of the workflow including the task and the request lineage data items associated with the task.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A method for tracking data lineage, the method comprises:
    detecting, with a data lineage recorder module, an execution of a task of a workflow by a workflow engine on a device, the workflow comprises a plurality of ordered tasks for execution on the workflow engine, wherein the data lineage recorder module captures events emitted from the workflow engine that do not pass through a data lineage proxy;
    receiving, at the data lineage proxy, a request sent from the device to the data lineage proxy for forwarding to a recipient;
    automatically identifying, with the data lineage proxy, an identity of the recipient of the request based on an IP address of the recipient for forwarding the request received at the data lineage proxy, a content of the request, or a content of a response associated with the request;
    selecting, with the data lineage recorder module, request lineage data items associated with the task from the content of the request;
    associating, in a data lineage database, the request lineage data items with the task currently executed by the workflow engine of the plurality of ordered tasks;
    forwarding, from the data lineage proxy, the request to the recipient;
    receiving, at the data lineage proxy, the response to the request from the recipient;
    automatically identifying the task and the device associated with the response to the request;
    selecting, with the data lineage recorder module, response lineage data items associated with the task from the content of the response to the request;
    associating, in the data lineage database, the response lineage data items with the task currently executed by the workflow engine of the plurality of ordered tasks;
    forwarding, from the data lineage proxy, the response to the device;
    recording, with the data lineage recorder module and based on the events emitted by the workflow engine, a completion of the task and an output of the task to a subsequent task within the workflow; and
    generating for display on a user interface device, a data lineage graph comprising representations of the plurality of ordered tasks of the workflow including the task, the request lineage data items associated with the task, the response lineage data items associated with the task, and input and output interconnections between the plurality of ordered tasks within the workflow.

2. The method of claim 1, further comprising:
    assigning a device identifier to the device executing the task; and
    wherein the request and the response to the request are detected by the data lineage proxy based on the device identifier of the device.

3. The method of claim 1, wherein the request comprises a call to a microservice, and the data lineage graph comprises a representation of the microservice and data lineage items associated with the microservice.

4. The method of claim 1, wherein the data lineage recorder module is configured to detect data from a plurality of types of workflow engines including a batch processing workflow engine and a stream processing workflow engine.

5. The method of claim 1, wherein the data lineage recorder module is configured to aggregate lineage data items from a plurality of workflow engines and the data lineage graph includes the lineage data items from the plurality of workflow engines.

6. The method of claim 1, wherein the data lineage recorder module is configured to record lineage data items from a plurality of datastores using different storage structures including one or more of a relational database management systems (RDBMS), a modern NoSQL databases, a document databases, a graph databases, a structured database, or semi-structured data.

7. The method of claim 1, wherein the data lineage recorder module is configured to record data from workflows utilizing different programming languages and programming libraries.

8. The method of claim 1, further comprising:
detecting, with the data lineage recorder module, an execution of the subsequent task of the workflow;
detecting, with the data lineage proxy, a subsequent request associated with the subsequent task sent from the device; and
selecting, with the data lineage recorder module, request lineage data items associated with the subsequent task from a content of the subsequent request,
wherein the data lineage graph further comprises representations of the request lineage data items associated with the subsequent task.

9. The method of claim 1, the data lineage graph further comprising representations one or more additional executions of the task and request lineage data items associated with one or more additional executions of the task.

10. The method of claim 1, further comprising:
providing a data lineage user interface to the user interface device, wherein the data lineage user interface comprises a configuration interface for configuring the selection of the request lineage data items from the content in the request.

11. The method of claim 1, wherein the data lineage proxy is configured to record and select request lineage data items from requests using a plurality of different communication protocols.

12. The method of claim 1, wherein the data lineage proxy is configured to forward the request to the recipient prior to associating the request lineage data item with the task in the data lineage database.

13. The method of claim 1, wherein the request lineage data items are selected from the content of the request based on system default and user-defined configurations.

14. A system for tracking data lineage, the system comprises:
a data lineage database; and
a processor coupled to the data lineage database and executing a data lineage recorder module, the processor being configured to:
detect, with the data lineage recorder module, an execution of a task of a workflow by a workflow engine on a device, the workflow comprises a plurality of ordered tasks for execution on the workflow engine, wherein the data lineage recorder captures events emitted from the workflow engine that do not pass through the data lineage proxy;
receive, from a data lineage proxy, a request sent from the device to the data lineage proxy for forwarding to a recipient;
automatically identify an identity of the recipient of the request based on an IP address of the recipient for forwarding the request received at the data lineage proxy, a content of the request, or a content of a response associated with the request;
select, with the data lineage recorder module, request lineage data items associated with the task from the content of the request;
associate, in the data lineage database, the request lineage data items with the task currently executed by the workflow engine of the plurality of ordered tasks;
receive, from the data lineage proxy, the response to the request from the recipient;
automatically identify the task and the device associated with the response to the request;
select, with the data lineage recorder module, response lineage data items associated with the task from the content of the response to the request;
associate, in the data lineage database, the response lineage data items with the task currently executed by the workflow engine of the plurality of ordered tasks;
record, with the data lineage recorder module and based on the events emitted by the workflow engine, a completion of the task and an output of the task to a subsequent task within the workflow; and
generate for display on a user interface device, a data lineage graph comprising representations of the plurality of ordered tasks of the workflow including the task, the request lineage data items associated with the task, the response lineage data items associated with the task, and input and output interconnections between the plurality of ordered tasks within the workflow.

15. The system of claim 14, wherein the processor is further configured to:
assign a device identifier to the device; and
wherein the request and the response to the request are detected by the data lineage proxy based on the device identifier of the device executing the task.

16. The system of claim 14, wherein the request comprises a call to a microservice, and the data lineage graph comprises a representation of the microservice and data lineage items associated with the microservice.

17. The system of claim 14, wherein the data lineage recorder module is configured to detect data from a plurality of types of workflow engines including a batch processing workflow engine and a stream processing workflow engine.

18. The system of claim 14, wherein the data lineage recorder module is configured to aggregate lineage data items from a plurality of workflow engines and the data lineage graph includes the lineage data items from the plurality of workflow engines.

19. The system of claim 14, wherein the data lineage recorder module is configured to record lineage data items from a plurality of datastores using different storage structures including one or more of a relational database management systems (RDBMS), a modern NoSQL databases, a document databases, a graph databases, a structured database, or semi-structured data.

20. The system of claim 14, wherein the data lineage recorder module is configured to record data from workflows utilizing different programming languages and programming libraries.

21. The system of claim 14, wherein the processor is further configured to:
    detect, with the data lineage recorder module, an execution of the subsequent task of the workflow;
    detect, with the data lineage proxy, a subsequent request associated with the subsequent task sent from the device; and
    select, with the data lineage recorder module, request lineage data items associated with the subsequent task from a content of the subsequent request,
    wherein the data lineage graph further comprises representations of the request lineage data items associated with the subsequent task.

22. The system of claim 14, the data lineage graph further comprising representations of one or more additional executions of the task and request lineage data items associated with the one or more additional executions of the task.

23. The system of claim 14, wherein the processor is further configured to:
    provide a data lineage user interface to the user interface device, wherein the data lineage user interface comprises a configuration interface for configuring the selection of the request lineage data items from the content in the request.

24. An apparatus for tracking data lineage comprising:
    a non-transitory storage medium storing a set of computer readable instructions; and
    a control circuit configured to execute the set of computer readable instructions which cause to the control circuit to:
        detect, with a data lineage recorder module, an execution of a task of a workflow by a workflow engine on a device, the workflow comprises a plurality of ordered tasks for execution on the workflow engine, wherein the data lineage recorder captures events emitted from the workflow engine that do not pass through a data lineage proxy;
        receive, from the data lineage proxy, a request sent from the device to the data lineage proxy for forwarding to a recipient;
        automatically identify an identity of the recipient of the request based on an IP address of the recipient for forwarding the request received at the data lineage proxy, a content of the request, or a content of a response associated with the request;
        select, with the data lineage recorder module, request lineage data items associated with the task from the content of the request;
        associate, in a data lineage database, the request lineage data items with the task currently executed by the workflow engine of the plurality of ordered tasks;
        receive, via the data lineage proxy, the response to the request from the recipient;
        automatically identify the task and the device associated with the response to the request;
        select, with the data lineage recorder module, response lineage data items associated with the task from the content of the response to the request;
        associate, in the data lineage database, the response lineage data items with the task currently executed by the workflow engine of the plurality of ordered tasks;
        record, with the data lineage recorder module and based on the events emitted by the workflow engine, a completion of the task and an output of the task to a subsequent task within the workflow; and
        generate for display on a user interface device, a data lineage graph comprising representations of the plurality of ordered tasks of the workflow including the task, the request lineage data items associated with the task, the response lineage data items associated with the task, and input and output interconnections between the plurality of ordered tasks within the workflow.

\* \* \* \* \*